United States Patent Office 3,840,501
Patented Oct. 8, 1974

3,840,501
COPOLYAMIDES OF 2,2-BIS(4-AMINOCYCLO-HEXYL)PROPANES AND A MIXTURE OF ALKANE DICARBOXYLIC ACIDS
Robert S. Shue and Robert W. Campbell, Bartlesville, Okla., assignors to Phillips Petroleum Company
No Drawing. Filed July 5, 1972, Ser. No. 269,098
Int. Cl. C08g 20/20
U.S. Cl. 260—78 R  11 Claims

ABSTRACT OF THE DISCLOSURE

Copolyamides of 2,2-bis(4-aminocyclohexyl)propane or methyl derivatives thereof and a mixture of adipic acid and higher straight chain dicarboxylic acid selected from the group consisting of suberic, azelaic, sebacic, and dodecanedioic acid have improved strength properties.

---

This invention relates to copolyamides of 2,2-bis(4-aminocyclohexyl)propanes.

In one of its more specific aspects, this invention relates to copolyamides of 2,2-bis(4-aminocyclohexyl)propane and straight chain dicarboxylic acids.

Polyamides prepared from 2,2-bis(4-aminocyclohexyl) propane, hereinafter referred to as PACP, and selected straight chain dicarboxylic acids, are well known. Such polyamides are used in the production of fibers and fabrics.

A homopolyamide of PACP and an acid such as adipic acid possesses, however, a certain thermal instability and brittleness, particularly when subjected to molding conditions.

It has now been discovered that copolyamides derived from PACP and a mixture of adipic acid with other diacids have a better combination of properties than those of the homopolyamides of the diamine and a single diacid. These copolyamides can be used as engineering thermoplastics, packaging materials and fibers.

According to this invention there is provided polymer prepared by reacting PACP or methyl derivatives thereof with a mixture of adipic acid and a higher molecular weight straight chain dicarboxylic acid under the prior art conditions for effecting such reactions. Preferably, the mixture of acids will comprise from about 20 to about 65 mole percent adipic acid with the balance of the mixture, that is, from about 35 to about 80 mole percent, being at least one higher, straight chain dicarboxylic acid selected from the group consisting of suberic, azelaic, sebacic and dodecanedioic acids. The PACP or methyl derivative thereof will be employed in a ratio of about 1 mole per mole of the acid mixture.

The PACP or methyl derivative thereof which can be used in this invention can be represented by the formula

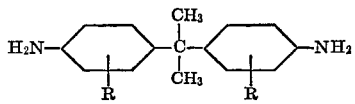

wherein each R is selected from hydrogen and methyl radicals. Any of the geometric isomers can be employed as can mixtures of the diamines.

The polyamides of this invention can be prepared by conventional polymerization procedure, e.g., by a melt polymerization process such as that described in U.S. Pat. 2,512,606. The molar ratio of the dicarboxylic acids to the diamine should be about 1 to 1 although a slight excess up to about 5 mole percent of the acids or diamine can be used.

The polymerization preferably is conducted at a temperature within the range of from about 260 to about 340° C. for about two to about six hours; however, polymerization temperatures and reaction times outside of these ranges can be employed. Water can be present to serve as a heat transfer agent and to aid in keeping the reactants in the reaction zone. Preferably, the pressure is reduced as the polymerization progresses.

The polyamides of this invention can be blended with fillers, pigments, stabilizers, softeners, extenders, other polymers, graphite, carbon black, titanium dioxide, carbon fibers, silica, asbestos, cotton floc, and the like in the usual manner.

In its preferred embodiment, the best mode of practicing the invention involves the use of a mixture of acids containing about 50 mole percent adipic acid and about 50 mole percent of the higher molecular weight acid.

The invention is illustrated by the following data. In each Example the trans,trans isomer content of the PACP was 74 weight percent.

EXAMPLE I

A mixture comprising 0.53 mole of PACP, 0.265 mole of adipic acid, 0.265 mole of azelaic acid and about 2.5 moles of distilled water was introduced into an autoclave. The autoclave was purged of air, pressured with nitrogen at 60 p.s.i.g. and heated to 210° C. at which temperature it was maintained for about one hour, the autoclave being vented as necessary to maintain its pressure at about 500–550 p.s.i.g.

The autoclave was then heated to 305° C. and maintained at this temperature for about one hour. At 305° C., the reactor was then vented to 0 p.s.i.g., swept with nitrogen and evacuated to 20 mm. Hg.

The polymer was recovered from the autoclave, particulated, dried, and compression molded at 560° F.

The polymers discussed hereinafter, including the homopolyamides of PACP and adipic acid and of PACP and azelaic acid, were prepared by comparable methods.

|  | I | II | III |
|---|---|---|---|
| Polymer reactants, mole ratio: |  |  |  |
| PACP | 4 | 4 | 4 |
| Adipic acid | 1 | 4 | 0 |
| Azelaic acid | 3 | 0 | 4 |
| Polymer properties: |  |  |  |
| Flexural modulus, p.s.i.×10⁻³ [a] | 273 | 342 | 254 |
| Tensile yield, p.s.i. [b] | 12,950 | *11,400 | 11,570 |
| Elongation, percent [b] | 19 | 9 | 17 |
| Izod impact, ft.-lbs./in. notch [c] | 1.16 | 0.68 | 1.03 |
| Heat deflection temp., ° F., 264 p.s.i. [d] | 321 | 349 | 290 |
| Hardness, Shore D [e] | 85 | 87 | 82 |

[a] ASTM D 790-66.
[b] ASTM D 638-68.
[c] ASTM D 256-56.
[d] ASTM D 648-56.
[e] ASTM D 2240-68.
\* Break.

These data indicate unexpected values of tensile strength and impact strength for polymer I employing the acid mixture, these values lying above the range of the values for those properties employing the acids individually.

EXAMPLE II

Comparisons such as that indicated above were also made between polymers produced from PACP and adipic acid, PACP and suberic acid and PACP and a mixture of adipic and suberic acids, the polymers being formed under substantially identical conditions. Tests on the polymers were as follows:

|  | I | II | III |
|---|---|---|---|
| Polymer reactants, mole ratio: |  |  |  |
| PACP | 4 | 4 | 4 |
| Adipic acid | 2 | 4 | 0 |
| Suberic acid | 2 | 0 | 4 |
| Polymer properties:[1] |  |  |  |
| Flexural modulus, p.s.i.×10⁻³ | 293 | 342 | 277 |
| Tensile yield, p.s.i. | *13,400 | *11,400 | 12,420 |
| Elongation, percent | 16 | 9 | 21 |
| Izod impact, ft.-lbs./in. notch | 0.78 | 0.68 | 1.25 |
| Heat deflection temp., 264 p.s.i., ° F. | 303 | 349 | 318 |
| Hardness, Shore D | 86 | 87 | 85 |

[1] See footnotes to table in Example I.
\*Break.

These data show that the polymer prepared by employing a mixture of adipic and suberic acids had an unexpectedly high tensile strength when compared with that of each of the two homopolyamides.

EXAMPLE III

Comparisons were also made between polymers produced from PACP and adipic acid, PACP and sebacic acid, and PACP and a mixture of adipic acid and sebacic acid. All polymers were formed under substantially identical conditions and tests on the polymers were as follows:

|  | I | II | III |
|---|---|---|---|
| Polymer reactants, mole ratio: |  |  |  |
| PACP | 4 | 4 | 4 |
| Adipic acid | 2 | 4 | 0 |
| Sebacic acid | 2 | 0 | 4.1 |
| Polymer properties:[1] |  |  |  |
| Flexural modulus, p.s.i.×10⁻³ | 284 | 342 | 248 |
| Tensile yield, p.s.i. | 11,940 | *11,400 | 9,760 |
| Elongation, percent | 17 | 9 | 33 |
| Izod impact, ft.-lbs./in. notch | 0.91 | 0.68 | 1.16 |
| Heat deflection temp., 264 p.s.i., °F | 302 | 349 | 296 |
| Hardness, Shore D | 85 | 87 | 85 |

[1] See footnotes to table in Example I.
*Break.

These data, again, indicate an unexpected value of tensile strength for the polymer prepared employing a mixture of the adipic and sebacic acid.

EXAMPLE IV

Comparisons were made between polymers produced from PACP and adipic acid, PACP and dodecanedioic acid and PACP and a mixture of adipic acid and dodecanedioic acid. As in the previous instances, all polymers were formed under substantially identical conditions and tests on the polymers were as follows:

|  | I | II | III |
|---|---|---|---|
| Polymer reactants, mole ratio: |  |  |  |
| PACP | 4 | 4 | 4 |
| Adipic acid | 2 | 4 | 0 |
| Dodecanedioic acid | 2 | 0 | 4.1 |
| Polymer properties:[1] |  |  |  |
| Flexural modulus, p.s.i.×10⁻³ | 267 | 342 | 239 |
| Tensile yield, p.s.i. | 11,490 | *11,400 | 8,360 |
| Elongation, percent | 34 | 9 | 50 |
| Izod impact, ft.-lbs./in. notch | 0.82 | 0.68 | 1.29 |
| Heat deflection temp., 264 p.s.i., °F | 295 | 349 | 277 |
| Hardness, Shore D | 84 | 87 | 80 |

[1] See footnotes to table in Example I.
*Break.

As in all the previous instances, these data indicate an unexpected value of tensile strength for the polymer produced employing a mixture of adipic acid and the higher molecular weight dicarboxylic acid.

It will be evident from the foregoing that various modifications can be made to the method of this invention. Such modifications, however, are considered to be within the scope thereof.

What is claimed is:

1. A composition of matter capable of being compression molded and consisting essentially of the copolyamide of (a) at least one of 2,2-bis(4-aminocyclohexyl)propane or methyl derivative thereof having the formula

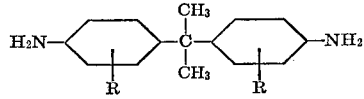

wherein R is hydrogen or methyl and, (b) a mixture of dicarboxylic acids consisting essentially of from about 20 to about 65 mole percent of adipic acid and from about 35 to about 80 mole percent of at least one acid selected from the group consisting of suberic acid, azelaic acid, sebacic acid and dodecanedioic acid, said 2,2-bis(4-aminocyclohexyl)propane and methyl derivative being employed in a ratio of about 1 mole per mole of said mixture of dicarboxylic acids.

2. The composition of matter defined in claim 1 in which the trans-trans isomer content of said 2,2-bis(4-aminocyclohexyl)propane or methyl derivative is about 74 weight percent.

3. The composition of claim 1 in which said mixture is adipic acid and azelaic acid in a mole ratio of about 1 to 3.

4. The composition of claim 1 in which said mixture is adipic acid and suberic acid in a mole ratio of about 1 to 1.

5. The composition of claim 1 in which said mixture is adipic acid and sebaic acid in a mole ratio of about 1 to 1.

6. The composition of claim 1 in which said mixture is adipic acid and dodecanedioic acid in a mole ratio of about 1 to 1.

7. A copolyamide capable of being compression molded and consisting essentially of the polymeric condensation product of 2,2-bis(4-aminocyclohexyl)propane and a mixture consisting essentially of from about 20 to about 65 mole percent of adipic acid and from about 35 to about 80 mole percent of at least one acid selected from the group consisting of suberic acid, azelaic acid, sebacic acid and dodecanedioic acid, said 2,2-bis(4-aminocyclohexyl)propane being employed in a ratio of about 1 mole per mole of said mixture of dicarboxylic acids.

8. The copolyamide of claim 7 in which said mixture is adipic acid and suberic acid.

9. The copolyamide of claim 7 in which said mixture is adipic acid and azelaic acid.

10. The copolyamide of claim 7 in which said mixture is adipic acid and sebacic acid.

11. The copolyamide of claim 7 in which said mixture is adipic acid and dodecanedioic acid.

References Cited
UNITED STATES PATENTS 3,703,595  11/1972  Falkenstein et al. ___ 260—78 R
2,512,606  6/1950  Bolton et al. _____ 260—78 R HAROLD D. ANDERSON, Primary Examiner U.S. Cl. X.R.
260—9, 37 N